(12) United States Patent
Cerrato et al.

(10) Patent No.: US 12,743,154 B2
(45) Date of Patent: Sep. 22, 2026

(54) TRACKING A GAZE DIRECTION OF A USER

(71) Applicant: Sony Interactive Entertainment Inc., Tokyo (JP)

(72) Inventors: Maurizio Cerrato, London (GB); Lawrence Martin Green, London (GB); Jun Yen Leung, London (GB); Maria Chiara Monti, London (GB); Patrick John Connor, London (GB); Rajeev Gupta, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 19/027,019

(22) Filed: Jan. 17, 2025

(65) Prior Publication Data

US 2025/0238079 A1 Jul. 24, 2025

(30) Foreign Application Priority Data

Jan. 19, 2024 (GB) ..................................... 2400762

(51) Int. Cl.
*G09G 5/00* (2006.01)
*G06F 3/01* (2006.01)

(52) U.S. Cl.
CPC .............. *G06F 3/013* (2013.01); *G06F 3/012* (2013.01)

(58) Field of Classification Search
CPC ................................. G06F 3/013; G06F 3/012
USPC .......................................................... 345/156
See application file for complete search history.

(56) References Cited

U.S. PATENT DOCUMENTS

| | | | | |
|---|---|---|---|---|
| 2012/0281181 | A1* | 11/2012 | Chen | G02B 30/35 351/159.76 |
| 2014/0138544 | A1 | 5/2014 | Sprague et al. | |
| 2016/0171323 | A1* | 6/2016 | Gadde | G06V 40/19 382/117 |
| 2018/0090052 | A1 | 3/2018 | Marsh et al. | |
| 2020/0004333 | A1* | 1/2020 | Lee | G06F 3/04845 |
| 2020/0026099 | A1* | 1/2020 | Jones | G02C 7/101 |
| 2021/0223863 | A1* | 7/2021 | Aleem | G02B 27/104 |
| 2022/0276703 | A1* | 9/2022 | Kim | G06V 40/18 |
| 2022/0319040 | A1 | 10/2022 | Legerton et al. | |
| 2024/0104967 | A1* | 3/2024 | Heideklang | G06F 3/013 |
| 2024/0288693 | A1* | 8/2024 | Kim | G02B 27/0179 |

OTHER PUBLICATIONS

Combined Search and Examination Report for Appln. No. GB2400762.7 dated Jul. 26, 2024, pp. 1-10.

learn.microsoft.com [online], "Eye tracking on HoloLens 2," Mar. 2, 2023, retrieved on Dec. 2, 2025, retrieved from URL<https://learn.microsoft.com/en-us/windows/mixed-reality/design/eye-tracking>, 8 pages.

* cited by examiner

*Primary Examiner* — Jonathan M Blancha
(74) *Attorney, Agent, or Firm* — Fish & Richardson P.C.

(57) ABSTRACT

A system for tracking a gaze direction of a user, the system comprising: a lens mountable on the surface of a user's eye, wherein the lens comprises a reflective element configured to reflect at least a portion of light incident on the lens; a photosensor configured to detect the reflected light; a processor configured to receive data from the photosensor and generate tracking information based on the detected reflected light so as to determine gaze directions of the user's eye.

20 Claims, 3 Drawing Sheets

131
130

131
130

131
130

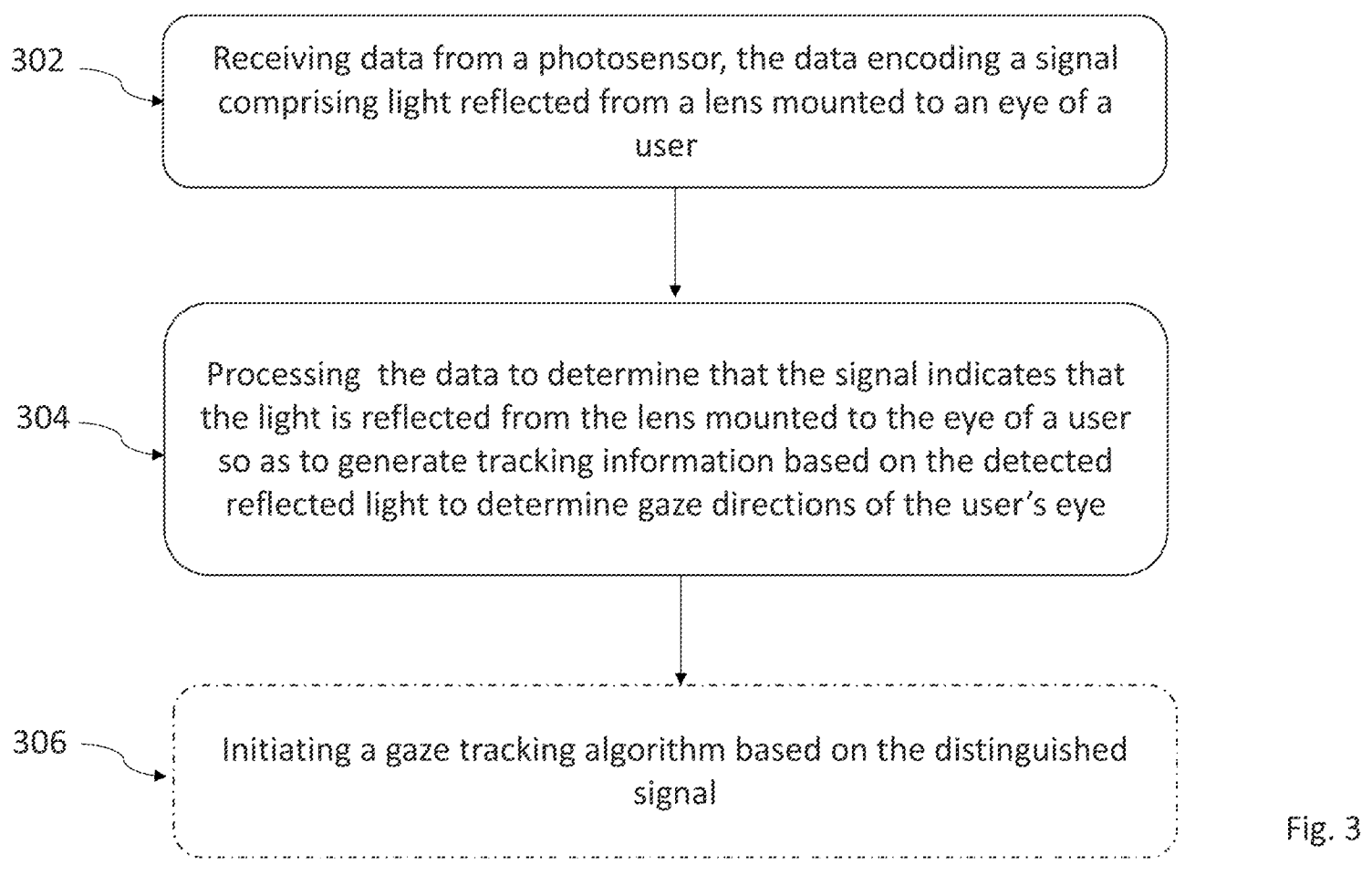

302 — Receiving data from a photosensor, the data encoding a signal comprising light reflected from a lens mounted to an eye of a user 304 — Processing the data to determine that the signal indicates that the light is reflected from the lens mounted to the eye of a user so as to generate tracking information based on the detected reflected light to determine gaze directions of the user's eye 306 — Initiating a gaze tracking algorithm based on the distinguished signal

Fig. 3

TRACKING A GAZE DIRECTION OF A USER

CROSS-REFERENCE TO RELATED APPLICATION

The present application claims priority from United Kingdom Patent Application No. GB2400762.7 filed Jan. 19, 2024, the disclosure of which is hereby incorporated herein by reference.

FIELD OF THE INVENTION

The present invention relates to a method and a system for tracking a gaze direction of a user and, more particularly, to a method and a system for tracking a gaze direction of a user during display of a virtual environment on a virtual reality headset.

BACKGROUND

Virtual Reality (VR) is a computer-simulated environment that simulates a user's presence in real or imaginary environments, such that the user feels as though they are physically in that environment. Presenting VR environments to a user may include displaying stereoscopic scenes, using a computer or stereoscopic display, to enhance the illusion of depth in the scenes. The VR environment can additionally include sounds presented through speakers or headphones and haptic feedbacks presented using a handheld controller or other haptic device. In particular, VR is often used to provide an immersive and interactive experience of a game played by the user to enhance their gaming experience.

One way for a user to interact with the virtual reality environment is through gaze tracking technology which monitors and records eye movements of the user. Current gaze tracking technology directs infrared light towards the pupil of the eye causing reflections in both the pupil and the cornea of the eye. This reflection, known as pupil centre corneal reflection (PCCR), can then be tracked using an infrared camera. The changes in these reflections captured by the infrared camera are then analysed to determine an eye rotation and a gaze direction based on this eye rotation.

However, this technique performs inconsistently between users as different users have different eye structures which influence the accuracy. In some situations, the tracking fails completely, and the user is required to turn off tracking. This may occur in instances when a user has an eye condition, has had eye surgery, has smudges on eyeglasses, or the user wears a type of contact lenses. Furthermore, the obtained data from the camera includes noisy data that need complex software solutions to filter.

Therefore, there is a need to improve the accuracy of eye tracking and to make eye tracking applicable for a range of people that current systems fail to support.

SUMMARY OF INVENTION

It is an object of the present invention to provide methods and systems which makes progress in solving some of the problems identified above.

In a first aspect of the present invention there is provided a system for tracking a gaze direction of a user, the system comprising: a lens mountable on the surface of a user's eye, wherein the lens comprises a reflective element configured to reflect at least a portion of light incident on the lens; a photosensor configured to detect the reflected light; a processor configured to receive data from the photosensor and generate tracking information based on the detected reflected light so as to determine gaze directions of the user's eye.

Using a lens mountable on the surface of a user's eye, also referred to as a "contact lens" for gaze tracking instead of traditional gaze tracking methods offers greater accuracy when tracking the user's eye movements. This is because the gaze tracking is no longer dependent on the eye shape or size of the user. Further, the above-described method allows for accurate gaze tracking to be provided to a wider range of users, including those with abnormal eye shapes and/or eye conditions which prevent current systems from accurately tracking the eye movement.

Preferably, the reflective element is configured so as to provide a distinguishing signal in the reflected light and the processing unit is further configured to process the data to identify the distinguishing signal.

The term "distinguishing signal in the reflected light" refers to a signal that is differentiated from other signals caused by, for example, light reflected by the user's eye or sunlight. The processor can differentiate between the distinguishing signal reflected from the lens and light reflected from other sources such that it can identify it as a signal reflected from the lens. This ensures that the appropriate gaze tracking algorithms can be used by the system that account for the light being reflected from the lens. Advantageously, this reduces noise in the signal, further improving the accuracy of the gaze tracking.

Preferably, the distinguishing signal differentiates the reflected light from the lens with light reflected directly from an eye. This ensures that the appropriate gaze tracking algorithms can be used by the system that account for the light being reflected from the lens.

In some examples, the reflective element has a characteristic shape such to provide the distinguishing signal in the reflective light. As such, the characteristic shape may be chosen so as to optimise differentiation of the distinguishing signal in the reflected light.

In some examples, the lens comprises a plurality of reflective elements arranged in a pattern such to provide a distinguishing signal in the reflected light. In this way, the reflective elements are distributed on or throughout the lens in a specific configuration. As such, the pattern may be chosen so as to optimise differentiation of the distinguishing signal in the reflected light.

Preferably, the processor is further configured to recognise the distinguishing signal as indicating that the light is reflected from a lens mounted on the user's eye so as to initiate a gaze tracking algorithm based on the distinguished signal in the reflected light.

In this way, appropriate gaze tracking algorithms can be used by the system that account for the light being reflected from the lens, and not for example, for light that is reflected by the eye. Advantageously, this reduces noise in the signal, further improving the accuracy of the gaze tracking.

Preferably, the system further comprises a light source arranged so as to emit light in a direction incident on the user's eye.

Preferably the light source is configured to emit infrared light. Infrared light is not visible to the human eye so it will not interfere with the user's vision. In this way, eye tracking can be carried out without distracting the user viewing and experiencing the virtual environment.

Preferably, the reflective element is configured to reflect a range of wavelengths of light. In other words, the reflective element reflects a specific or limited range of wavelengths.

Preferably, the reflected range of the wavelengths is in the infrared range. This results in a reduction in noise in the detected signal at the photodetector. In this way, the quality of the detected signal is improved thereby improving the measurements and tracking information deduced from said signal.

Preferably, an artificial intelligence algorithm is used to determine gaze directions based on the generated tracking information.

Preferably, the system is configured for tracking a gaze direction of a user during display of a virtual environment on a virtual reality (VR) headset.

Preferably, the processor is further configured to perform foveated rendering on display content of the virtual environment based on the determined gaze directions of the user.

Foveated rendering is a rendering technique used when generating a virtual environment to improve efficiency by reducing the rendering workload. This rendering technique mimics the human eye's natural system, that is that the eye is highly sensitive to details at the centre of vision but is less sensitive to details at the periphery of vision. Therefore, by reducing the level of detail at the periphery of vision and focusing on those that the user is looking at, computational resources are effectively allocated.

Preferably, the system further comprises a head tracking sensor configured to track the orientation of the user's head. Preferably, the determination of the gaze direction is further based on the orientation of the user's head. In this way, the accuracy of the gaze tracking is improved.

In a second aspect of the present invention there is provided a computer implemented method for performing gaze tracking, the method comprising: receiving data from a photosensor, the data encoding a signal comprising light reflected from a lens mounted to an eye of a user; and processing the data to determine that the signal indicates that the light is reflected from the lens mounted to the eye of a user so as to generate tracking information based on the detected reflected light to determine gaze directions of the user's eye.

Preferably, the signal is a distinguishing signal in the reflected light from the lens mounted to the eye of the user and the step of processing the data further comprises identifying the distinguishing signal.

Preferably, the distinguishing signal differentiates the reflected light from the lens with light reflected directly from an eye.

In some examples, the step of processing the data further comprises identifying a distinguishing signal in the reflected light associated with a reflection from a reflective element of the lens which has a characteristic shape. As such, the characteristic shape may be chosen so as to optimise differentiation of the distinguishing signal in the reflected light.

In some examples, the step of processing the data further comprises identifying a distinguishing signal in the reflected light associated with a reflection from plurality of reflective elements of the lens which are arranged in a pattern. shape. As such, the pattern may be selected so as to optimise differentiation of the distinguishing signal in the reflected light.

Preferably, the step of processing the data further comprises recognising the distinguishing signal as indicating that the light is reflected from a lens mounted on the user's eye so as to initiate a gaze tracking algorithm based on the distinguished signal in the reflected light. In this way, appropriate gaze tracking algorithms can be used so as to account for the light being reflected from the lens, and not for example, for light that is reflected by the eye. Advantageously, this reduces noise in the signal, further improving the accuracy of the gaze tracking.

Preferably, the step of processing the data comprising using an artificial intelligence algorithm to determine gaze directions based on the generated tracking information.

Preferably, the method of tracking a gaze direction of a user is during display of a virtual environment on a virtual reality, VR, headset.

Preferably, the step of processing the data comprises performing foveated rendering on display content of the virtual environment based on the determined gaze directions of the user. In this way, by reducing the level of detail at the periphery of vision and focusing on those that the user is looking at, computational resources are effectively allocated.

Preferably, the method further comprises obtaining a head tracking data and processing the head tracking data so as to obtain an orientation of the user's head. In this way, the accuracy of the gaze tracking is improved.

In a third aspect of the present invention there is provided a lens for use with a processor configured to determining a gaze direction of a user; the lens being mountable on the surface of a user's eye, wherein at least a portion of the lens comprises a reflective element configured to reflect at least a portion of light incident on the lens so as to facilitate a determinate of the gaze directions of the user's eye by the system.

Preferably, the reflective element is configured so as to provide a distinguishing signal in the reflected light and the processor is further configured to process the data to identify the distinguishing signal.

BRIEF DESCRIPTION OF DRAWINGS

FIG. 3 schematically illustrates a flowchart of an exemplary method according to the present invention.

DETAILED DESCRIPTION

Virtual reality (VR) headsets will often incorporate gaze tracking into VR games in order to enhance user experience and gameplay. For example, gaze tracking may be used to facilitate interaction of the user with the virtual environment. For example, it may be used to aim or make selections by the user looking at components or objects in said environment. Therefore, using gaze tracking reduces the need for additional components such as a peripheral device to facilitate user inputs. Moreover, eye tracking can be used to dynamically change the game based on the user's gaze, thereby creating a more interactive virtual environment.

Using contact lenses for gaze tracking over traditional gaze tracking methods can offer greater accuracy when tracking the user's eye movements. Further, using contact lenses makes gaze tracking applicable to a wider range of user's, including those with abnormal eye shapes and/or eye conditions which prevent current systems from accurately tracking the eye movement. This is because the reflection of light is no longer dependent on the shape of the eye or distance between the eyes, which varies between users. Therefore, using a contact lens standardises the signal obtained by an infrared camera leading to improved accuracy with measurements.

Figure 1:
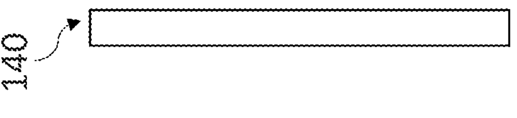
FIG. 1 schematically illustrates a system according to the present invention.
Figure 1:
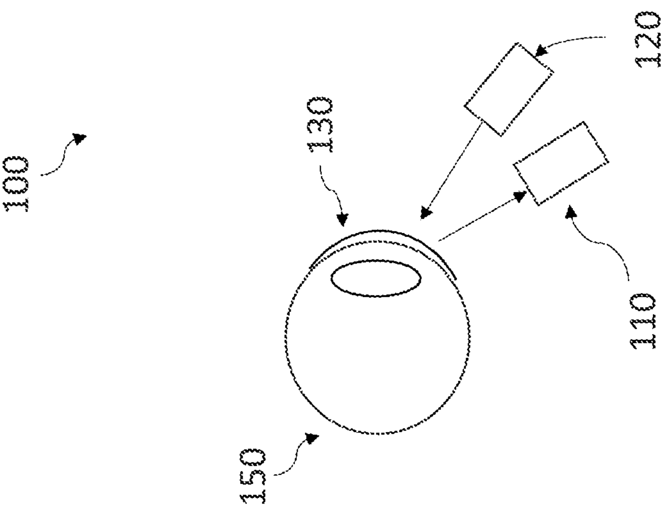

FIG. 1 illustrates a system 100 according to the present invention. As shown in the Figure, the user wearing a lens 130 according to the present invention.

In some embodiments, at least a portion of the system 100 may be included in or mounted to a VR headset. VR headset is coupled to a VR console comprising a computer having at least one processor. In some examples, a VR console is configured to execute a video game and/or audio from video game to be provided to the user by a display 140 the VR headset. The user may use a peripheral device, such as a game controller, mouse, keyboard or any other suitable device, to further interact with the video game. The VR headset is worn in a similar manner to that of wearing glasses, goggles and is configured to present content to the user, such as a computer generated, 3-dimensional (3D) virtual environment represented by visual display content. In other examples, the gaze tracking system may be mounted or embedded in or on other systems, such as on a display screen and/or a computer configured to process and display a video game.

The lens 130 worn on the eye 150 of the user comprises a reflective element configured to reflect at least a portion of light incident on the lens. The lens 130 of the present invention can be considered as similar to a typical contact lens for cosmetic purposes. Cosmetic lenses often comprise a decorative portion, such as a coloured portion, so as to change the appearance of the user's eye. The coloured portion is typically located at the periphery of the iris when the lens is worn by a user. However, instead of the coloured portion of a typical cosmetic lens, a lens 130 according to the present invention comprises reflective element(s) configured to reflect infrared light. In other words, the lens 130 of the present invention comprises reflective element(s) (such as reflective particle(s)) arranged at the periphery of the iris (i.e. around the iris) when worn by a user so as to reflect incident infrared light from the light source 120. By arranging the reflective particles in this way, the vision of the user is not hindered when wearing the lens 130.

In this example, the system 100 comprises a light source 120, which may be mounted to a VR headset, and arranged so as to illuminate the user's eye(s) 150. As such, the light source 120 is arranged so as to emit light incident on the user's eye 150. The light source 120 is configured to emit infrared light. In this way, the user will not be able to see the light intended for gaze tracking, and therefore it will not interfere with their experience of the virtual environment. In this example, since the light source 120 is configured to emit infrared light and the reflective element is configured to reflect the incident infrared light from the light source 120.

Therefore, when the user's eye is illuminated by the light source, at least a portion of the light is reflected by the reflective elements of the lens 130. The reflective elements of the lens 130 may comprise any suitable reflective particles. In conventional systems, infrared light is directed towards the pupil of the eye causing reflections in both the pupil and the cornea of the eye. This pupil centre corneal reflection (PCCR) is tracked using an infrared camera. However, in the present invention the reflection from the reflective element of the lens 130 is tracked rather than tracking the PCCR.

The system 100 comprises a photosensor 110 which may be at least one of a camera or infrared sensor. In this example, a camera 110 is mounted to the VR headset and is arranged facing the user's eyes so as to obtain images of the reflected infrared light from the lens 130. The system 100 may comprise a plurality of cameras arranged at different locations on the VR headset so as to obtain more data on the reflected light from the lens 130. The photosensor 110 is configured to detected light of the same wavelength to that reflected by the lens 130. As such, in this example, the photosensor 110 is configured to detect infrared light.

The system 100 further comprises a processor configured to receive data from the photosensor 110 and generate tracking information based on the detected reflected light. The processor may use eye tracking algorithms to generate tracking information so as to determine gaze directions of the user's eye 150. The processor may be integrated with the VR headset or may be part of the computer in communication with the VR headset.

In some examples, the reflective element is configured so as to provide a distinguishing signal in the reflected light and the processor is further configured to process the data to identify the distinguishing signal. The distinguishing signal differentiates the reflected light from the lens with light reflected directly from an eye. In this way, the system can recognise whether the user is wearing a lens and can apply gaze tracking algorithms accordingly.

Figures 2A, 2B, 2C:
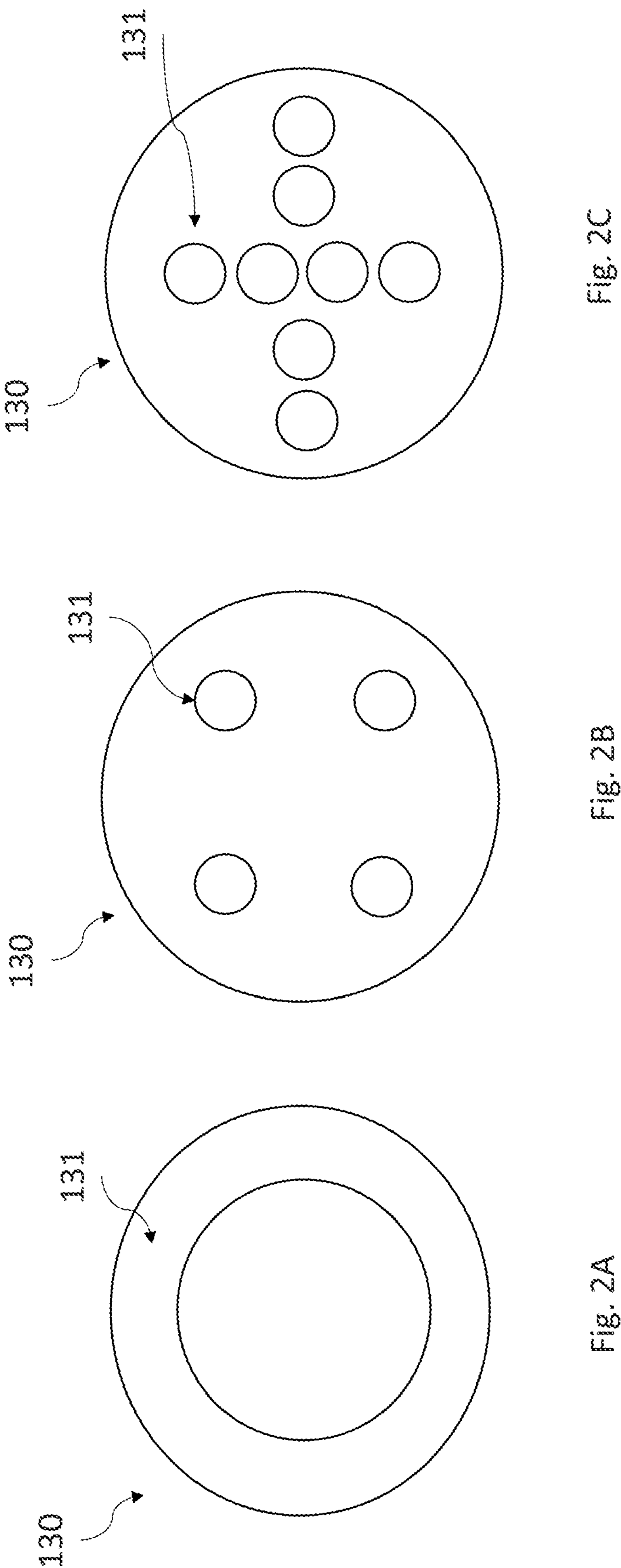
FIGS. 2A, 2B and 2C schematically illustrates a lens according to the present invention.

FIG. 2A illustrates a lens 130 according to the present invention comprising a reflective element 131 having a characteristic shape. In this example, the reflective element 131 is arranged around the periphery of the lens 130. This configuration of the reflective element 131 will provide a distinguishing signal in the reflected light that can be identified by the processor. Advantageously, by arranging the reflective element 131 in this way, there is greater flexibility in the materials suitable for the reflective element 131 as it is not required to be permeable by visible light since the reflective element 131 does not directly hinder the user's vision.

FIG. 2B and FIG. 2C show a lens according to the present invention, the lens having a plurality of reflective elements 131 arranged in a pattern. FIG. 2B shows the reflective elements 131 arranged in a square formation while FIG. 2C shows the reflective elements 131 arranged in a cross pattern. These configurations of the reflective element 131 will provide a distinguishing signal in the reflective that can be identified by the processor.

In some examples, upon recognising the distinguishing signal, the system 100, which may previously have been carrying out gaze tracking using PCCR, can switch from an algorithm suited to this type of gaze tracking to one suited to gaze tracking where the reflected light is reflected by the lens rather than the eye.

For example, the system 100 may initially be using an algorithm designed for PCCR. This algorithm may calculate a vector that connects the corneal reflection point to the centre of the pupil in an image taken by the camera 110 so as to determine the orientation of the eye 150. The vector is according to the line of sight i.e. the gaze direction. This algorithm may continuously update the gaze direction by tracking the relative movement between the corneal reflection and the pupil as the user's eye 150 moves.

When the processor recognises the distinguishing signal indicating that the user is wearing a lens, it may switch to an algorithm able to determine gaze based on this distinguishing signal. For example, the lens has a set curvature which can be known by the model and accounted for in calculations. This improves accuracy of tracking information as there is a reduction in the variation of the curvature of the cornea between users. Further, the distinguishing signal provided to the processor may indicate the orientation of the pattern of reflective elements such that the processor may be configured to determine an orientation of the eye based on the orientation of the pattern. Therefore, gaze tracking information can be generated by determining changes in the orientation of the pattern as the orientation of the eye varies.

Using the obtained tracking information, an artificial intelligence algorithm can be used to determine gaze directions based on the generated tracking information.

In some examples, the algorithm may be configured to use trigonometric calculations to determine a gaze direction of the user. Triangulation is a process of determining a position of an unknown point by forming triangles to the unknown point from known points. For example, positions are known for points A and B. In the present invention, these points may be the location of cameras on located, for example, on a VR headset. Point C may be the position of a reflective element on the lens. The unknown position of point C can be calculated using triangulation methods.

In some examples, the algorithm determines the angle from known point A to unknown point C, the angle from known point B to unknown point C, and the distance from point A and B. Using trigonometry, the position of unknown point C can be calculated. In this way, the algorithm can determine the position of the reflective element. By approximating the cornea as a point mapped on a sphere, the gaze direction can be determined based on this position. Therefore, this method is particularly useful when the lens comprises only one reflective element or when the reflective element has no distinct pattern.

In some examples, the algorithm may be configured to use multiple point trigonometry to determine a gaze direction of the user. For example, the positions are known for points A and B. Point C, D and E may be the unknown positions of reflective elements on the lens. In other examples, more or less unknown positions may be calculated based on the number of reflective elements on said lens. The above-described process to calculate the unknown position of point C can be used to calculate the position of points D and E.

Therefore, when the points C, D and E are arranged in a distinct pattern on the lens, the calculated positions of points C, D and E can be used to determine a rotation of the eye. This method is particularly effective when a plurality of reflective elements arranged in a pattern or when the reflective element has a characteristic shape.

This algorithm may continuously update the gaze direction as the user's eye moves.

In some examples, the processor is further configured to perform foveated rendering on display content of the virtual environment based on the determined gaze directions of the user. This rendering technique mimics the human eye's natural system, that is that the eye is highly sensitive to details at the centre of vision but is less sensitive to details at the periphery of vision. Therefore, the rendered display content of the virtual environment can be rendered such that content in or proximal to the gaze direction of the user is fully rendered while display content determined to be at the periphery of vision based on the gaze direction is only partially rendered. The viewed display content by the user will be similar to fully rendered display content.

In some examples, the system 100 further comprises a head tracking sensor configured to track the orientation of the user's head. In this example, the head tracking sensor is mounted to the VR headset. The head tracking sensor is configured to determine a position and/or orientation of the user's head. The head tracking sensor may be one or more of an Inertial Measurement Unit (IMU), a camera, an Electro-Magnetic Interference (EMI) System etc. The algorithms used by the processor can account for data obtained by the head tracking sensor so as to improve the accuracy of the gaze tracking.

FIG. 3 illustrates a flow chart of a computer-implemented method according to the present invention. The method can be carried out on the processor of the VR console. At step 302, the processor receives data from a photosensor, the data encoding a signal comprising light reflected from a lens mounted to an eye of a user. Specifically, the signal is a distinguishing signal in the reflected light from the lens mounted to the eye of the user and the step of processing the data further comprises identifying the distinguishing signal. At step 304, the method comprises, by the processor, processing the data to determine that the signal indicates that the light is reflected from the lens mounted to the eye of a user so as to generate tracking information based on the detected reflected light to determine gaze directions of the user's eye. At step 306, the processor initiates a gaze tracking algorithm based on the distinguished signal. The gaze tracking algorithm may be an artificial intelligence algorithm as described herein.

The invention claimed is:

1. A computer implemented method comprising:

receiving, from a photosensor, data encoding a representation of light that was reflected from an eye of a user;

determining whether the representation of the light that was reflected from the eye of the user indicates a presence of one or more reflective elements; and selecting, from among multiple gaze tracking algorithms, a particular gaze tracking algorithm to apply to subsequently received data from the photosensor, based at least on determining whether the representation of the light that was reflected from the eye of the user indicates a presence of one or more reflecting elements.

2. The method of claim 1, comprising selecting a particular gaze tracking algorithm that is associated with reflective elements based at least on determining that the representation of the light that was reflected from the eye of the user indicates the presence of the one or more reflective elements.

3. The method of claim 1, comprising selecting a pupil center corneal reflection (PCCR) gaze tracking algorithm based at least on determining that the representation of the light that was reflected from the eye of the user indicates that no reflective elements are present.

4. The method of claim 1, wherein determining whether the representation of the light that was reflected from the eye of the user indicates the presence of the one or more reflective elements comprises determining whether the representation of the light indicates a presence of a particular pattern of reflective elements.

5. The method of claim 1, wherein determining whether the representation of the light that was reflected from the eye of the user indicates the presence of the one or more reflective elements comprises determining whether the representation of the light indicates a characteristic shape.

6. The method of claim 1, wherein the photosensor is mounted on a head-mounted display.

7. The method of claim 1, wherein the particular gaze tracking algorithm is selected by one or more processors on a head-mounted display.

8. The method of claim 1, wherein determining whether the representation of the light that was reflected from the eye of the user indicates the presence of the one or more reflective elements comprises determining whether the representation of the light indicates a presence of a distinguishing signal.

9. A system comprising:

one or more processors, and one or more non-transitory computer readable media that store computer instructions which, when executed by the one or more processors, cause the one or more processors to perform operations comprising:

receiving, from a photosensor, data encoding a representation of light that was reflected from an eye of a user;

determining whether the representation of the light that was reflected from the eye of the user indicates a presence of one or more reflective elements; and selecting, from among multiple gaze tracking algorithms, a particular gaze tracking algorithm to apply to subsequently received data from the photosensor, based at least on determining whether the representation of the light that was reflected from the eye of the user indicates a presence of one or more reflecting elements.

10. The system of claim 9, wherein the operations comprise selecting a particular gaze tracking algorithm that is associated with reflective elements based at least on determining that the representation of the light that was reflected from the eye of the user indicates the presence of the one or more reflective elements.

11. The system of claim 9, wherein the operations comprise selecting a pupil center corneal reflection (PCCR) gaze tracking algorithm based at least on determining that the representation of the light that was reflected from the eye of the user indicates that no reflective elements are present.

12. The system of claim 9, wherein determining whether the representation of the light that was reflected from the eye of the user indicates the presence of the one or more reflective elements comprises determining whether the representation of the light indicates a presence of a particular pattern of reflective elements.

13. The system of claim 9, wherein determining whether the representation of the light that was reflected from the eye of the user indicates the presence of the one or more reflective elements comprises determining whether the representation of the light indicates a characteristic shape.

14. The system of claim 9, wherein the photosensor is mounted on a head-mounted display.

15. The system of claim 9, wherein the particular gaze tracking algorithm is selected by one or more processors on a head-mounted display.

16. A non-transitory computer readable medium that stores computer instructions which, when executed by one or more processors, cause the one or more processors to perform operations comprising:

receiving, from a photosensor, data encoding a representation of light that was reflected from an eye of a user;

determining whether the representation of the light that was reflected from the eye of the user indicates a presence of one or more reflective elements; and selecting, from among multiple gaze tracking algorithms, a particular gaze tracking algorithm to apply to subsequently received data from the photosensor, based at least on determining whether the representation of the light that was reflected from the eye of the user indicates a presence of one or more reflecting elements.

17. The medium of claim 16, wherein the operations comprise selecting a particular gaze tracking algorithm that is associated with reflective elements based at least on determining that the representation of the light that was reflected from the eye of the user indicates the presence of the one or more reflective elements.

18. The medium of claim 16, wherein the operations comprise selecting a pupil center corneal reflection (PCCR) gaze tracking algorithm based at least on determining that the representation of the light that was reflected from the eye of the user indicates that no reflective elements are present.

19. The medium of claim 16, wherein determining whether the representation of the light that was reflected from the eye of the user indicates the presence of the one or more reflective elements comprises determining whether the representation of the light indicates a presence of a particular pattern of reflective elements.

20. The medium of claim 16, wherein determining whether the representation of the light that was reflected from the eye of the user indicates the presence of the one or more reflective elements comprises determining whether the representation of the light indicates a characteristic shape.

* * * * *